(12) United States Patent
Lemke

(10) Patent No.: US 6,813,344 B1
(45) Date of Patent: Nov. 2, 2004

(54) METHOD AND SYSTEM FOR PROVIDING INFORMATION FOR IDENTIFYING CALLERS BASED ON A PARTIAL NUMBER

(75) Inventor: Steve Lemke, Sunnyvale, CA (US)

(73) Assignee: Palm Source, Inc., Sunnyvale, CA (US)

( * ) Notice: Subject to any disclaimer, the term of this patent is extended or adjusted under 35 U.S.C. 154(b) by 144 days.

(21) Appl. No.: 09/942,481

(22) Filed: Aug. 29, 2001

(51) Int. Cl.⁷ ................. H04M 1/56; H04M 15/06; H04M 3/42

(52) U.S. Cl. ............... 379/142.06; 379/142.01; 379/142.1; 379/88.21; 379/93.23; 455/415; 455/556

(58) Field of Search ............. 379/142.01–142.18, 379/88.11, 88.19, 88.21, 93.23, 167.08, 167.12, 207.16, 211.01, 372, 373.01, 373.02, 375.01, 399.01, 387.01; 455/415, 95, 100, 550, 556, 557, 567, 575

(56) References Cited

U.S. PATENT DOCUMENTS

| | | | | |
|---|---|---|---|---|
| 5,481,594 A | * | 1/1996 | Shen et al. | 379/142.17 |
| 5,832,072 A | * | 11/1998 | Rozenblit | 379/246 |
| 5,883,943 A | * | 3/1999 | Siddiqui | 379/142.01 |
| 5,905,786 A | * | 5/1999 | Hoopes | 379/142.01 |
| 6,266,539 B1 | * | 7/2001 | Pardo | 455/556 |
| 6,324,272 B1 | * | 11/2001 | Abu-Shukhaidem et al. | 379/142.06 |
| 6,353,664 B1 | * | 3/2002 | Cannon et al. | 379/142.1 |
| 6,434,394 B1 | * | 8/2002 | Grundvig et al. | 455/463 |

* cited by examiner

Primary Examiner—Quoc Tran
(74) Attorney, Agent, or Firm—Wagner, Murabito & Hao LLP

(57) ABSTRACT

Embodiments of the present invention include a caller identification system and method for identifying a caller with a partial phone number look-up table. The caller identification system comprises a database that stores received calls and can be personalized to include information specific to partial phone numbers. In one embodiment, the caller identification system disclosed can be integrated into a cellular phone. In this embodiment, an incoming call initiates a search in a database to retrieve information about the caller. If a match is found, the identity of the caller is displayed. When an exact match is not found, a search for a partial match is executed with wild card values and information about the partial match is displayed. Information for a partial match can be personalized or pre-programmed into the caller ID system such as the city associated with a particular area code or prefix.

28 Claims, 10 Drawing Sheets

400

| DATABASE | | | INCOMING |
|---|---|---|---|
| IDENTIFIER | PHONE NUMBER | | PHONE NUMBER |
| SANTA CLARA CO. | (408)###-#### | | (408)987-6543 |
| CELLULAR CUSTOMER | (408)691-#### | | (408)691-1234 |
| SAN JOSE | (408)321-#### | | (408)321-1234 |
| WORK | (408)123-45## | | (408)123-4567 |
| JOHN DOE | (555)555-5555 | | (555)555-5555 |

401 — 402 — 403

400

| DATABASE | |
|---|---|
| IDENTIFIER | PHONE NUMBER |
| SANTA CLARA CO. | (408)###-#### |
| CELLULAR CUSTOMER | (408)691-#### |
| SAN JOSE | (408)321-#### |
| WORK | (408)123-45## |
| JOHN DOE | (555)555-5555 |

401 / 402

| INCOMING |
|---|
| PHONE NUMBER |
| (408)987-6543 |
| (408)691-1234 |
| (408)321-1234 |
| (408)123-4567 |
| (555)555-5555 |

METHOD AND SYSTEM FOR PROVIDING INFORMATION FOR IDENTIFYING CALLERS BASED ON A PARTIAL NUMBER

BACKGROUND OF THE INVENTION

1. Field of the Invention

The present invention relates to caller identification. More specifically, the present invention pertains to a method and system that enables caller identification look-up functions to be performed with partial phone numbers.

2. Related Art

Computer systems and other electronic devices have become integral tools that are used extensively to perform a wide variety of useful operations in modern society. Computer systems along with other electronic devices are finding new applications as a result of advances in hardware technology and rapid development in software technology. The growing affordability of computer systems and electronic devices together with the abundance of useful new applications contributes to strong demand for such systems and devices.

Specifically, as the components required to build a computer system have been greatly reduced in size, new categories of computer systems have emerged. One of these new categories of computer systems is the Personal Digital Assistant (PDA). A PDA is a portable computer system that is small enough to be held conveniently and comfortably in the hand of its user. In particular, a popular size for the typical PDA approximates the size of a palm.

The PDA is usually a battery-powered device that is typically used as an electronic organizer having the capability to store and display a wide range of information which can include numerous addresses and telephone numbers of business and personal acquaintances, financial information, daily appointments, along with various other personal information. As such, the PDA is able to consolidate a wide variety of information and make the information easily accessible by its user. Therefore, PDAs are very useful and have gained wide popularity.

As the popularity of personal digital assistants increases, more functions and devices are integrated into a PDA. One example is the integration of a cellular phone into the PDA. Combining a Personal Digital Assistant with a cellular phone provides a very powerful device for a multitude of functions. One function in particular is caller identification. The benefits of caller identification have been appreciated, but when combined with a Personal Digital Assistant, more opportunities arise.

Caller identification provides the called party with the name and/or telephone number of the calling party. Caller identification is usually provided to a customer by its local central office. Most often, each central office has access to a local database containing telephone numbers and the corresponding names of people within its local area. Before connecting a call to the called party, the central office searches its database for the telephone number of the calling party. If the telephone number is found within the database, the name corresponding to that number will be accessed and are delivered to the called party by the central office using a predetermined protocol.

If the telephone number and name are not stored on the database, the service cannot provide a name to the called party. When a service is unable to identify a name corresponding to the number, it may deliver only the phone number and a message indicating that the calling party's name is unavailable. This is an undesirable result for a customer who wants to know information about the party calling. Particularly with the use of cellular phones, the caller ID function provides only the phone number of the calling party. Unless a phone number has been previously programmed into the phone, the resulting display only provides the phone number of the caller. Without any further information about the caller, except the caller's phone number, the user may not know anything about the caller thereby loosing the benefits of caller ID.

SUMMARY OF THE INVENTION

Thus, there exists a need for a device that uses a partial phone number or a wild card entry to identify characteristics of an incoming call. The present invention uses a Personal Digital Assistant and a caller ID to provide detailed information to a called party. With the use of a Personal Digital Assistant, the called party can retrieve information about the caller even if the caller ID does not provide the name of the caller.

In accordance with the present invention, a caller identification system and method are disclosed to permit caller identification of partial phone numbers. Embodiments of the present invention provide a flexible and programmable caller identification system that can provide information about phone numbers not previously recorded in a caller ID database. In addition, the caller ID system can be integrated into a portable electronic device, e.g., a portable computer system to further expand the capabilities of a partial information caller identification system. When the caller ID service can't provide the name of the caller, the PDA is queried to give any information that corresponds to the telephone number of the caller. For example, the PDA could have a stored database of area codes and corresponding cities. When a call is received, and no caller ID information is supplied, the PDA could be queried to provide the name of the city that corresponds to the area code of where the call was coming from. Likewise, the PDA can have a stored database of telephone prefixes of cellular phone carriers. This would allow a user to be notified that a call was originated from a cellular phone and be provided information about the caller such as the cellular provider the caller is using.

Embodiments of the present invention include a caller identification system and method for identifying a caller with a partial phone number look-up table. The caller identification system comprises a database that stores received calls and can be personalized to include information specific to partial phone numbers. In one embodiment, the caller identification system disclosed can be integrated into a cellular phone. In this embodiment, an incoming call initiates a search in a database to retrieve information about the caller. If a match is found, the identity of the caller is displayed. When an exact match is not found, a search for a partial match is executed and information about the partial match is displayed. Information for a partial match can be personalized or pre-programmed into the caller ID system such as the city associated with a particular area code or prefix. In particular, phone numbers with wild card flags can be programmed into the database to facilitate this type of search.

More specifically, in one embodiment, a Personal Digital Assistant (PDA) is coupled to the caller identification system. The caller identification system comprises a telephone sub-circuit for receiving telephone calls, caller identification logic for receiving caller identification, a memory for storing a database of received and pre-programmed phone numbers and partial phone numbers, and a processor for determining a match or the closest match between the incoming caller ID information and the caller ID information stored in the database. In another embodiment, the match logic and the database can be located in a remote server and the caller identification is transmitted to the display unit.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is an illustration of database that is used in one embodiment of the present invention.

DETAILED DESCRIPTION OF THE INVENTION

In the following detailed description of the present invention, a method and system for caller identification with a partial phone number look-up table, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "posting", "opening", "sending", "monitoring", "examining" or the like, refer to the action and processes of a computer system (e.g., FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
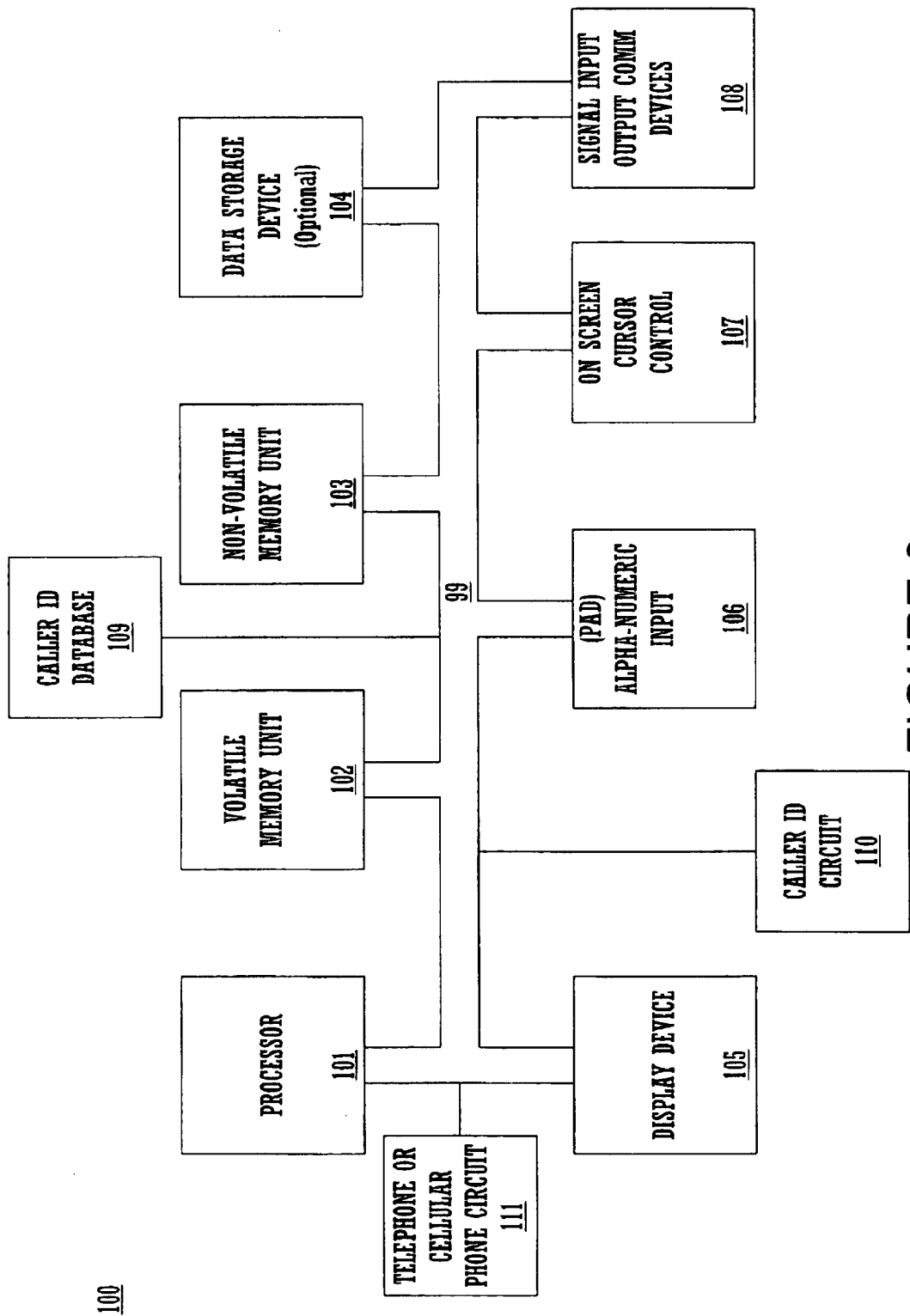
FIG. 3 is a logical block diagram of circuitry located within the exemplary personal digital assistant computer system of FIG. 2A.

Aspects of the present invention, described below, are discussed in terms of steps executed on a computer system. These steps (e.g., process 600) are implemented as program code stored in computer readable memory units of a computer system and are executed by the processor of the computer system. Although a variety of different computer systems can be used with the present invention, an exemplary personal digital assistant computer system is shown in FIG. 3 further below.

Figure 1:
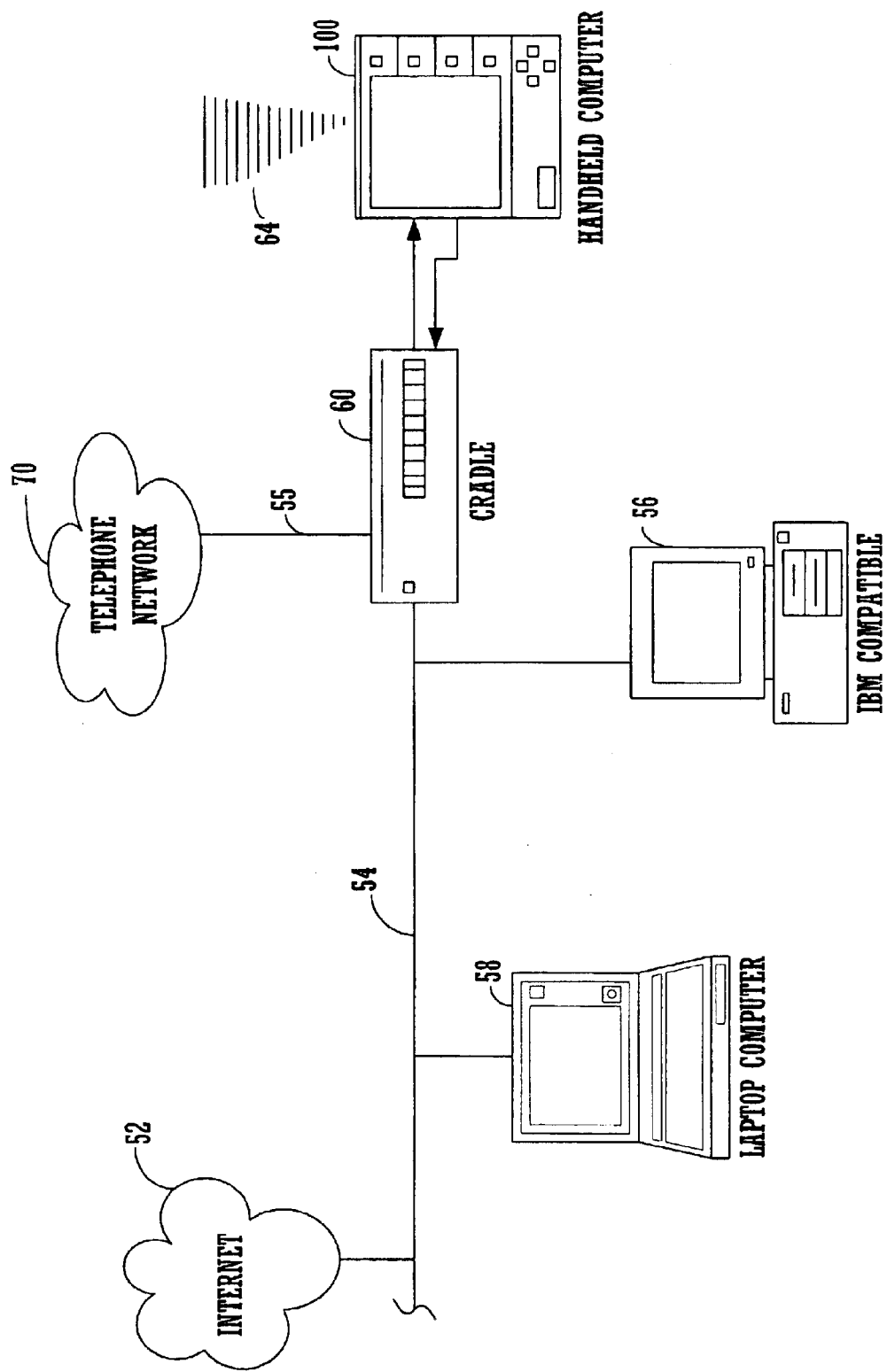
FIG. 1 is a system illustration of an exemplary personal digital assistant computer system connected to other computer systems and the Internet via a cradle device.

Referring now to FIG. 1, a system 50 that may be used in conjunction with the present invention is shown. It is appreciated that the method and system for caller identification with partial information can be used in conjunction with any computer system and that system 50 is illustrative rather than limiting. It is further appreciated that the portable computer system 100 described below is only exemplary. System 50 comprises a host computer system 56 which can either be a desktop unit as shown, or, alternatively, can be a laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well-known protocols. Additionally, system 50 can be connected to telephone network 70 by communications bus 55, which in one embodiment can be a telephone line, but could be of any number of well-known designs.

Importantly, bus 54 is also coupled to a cradle 60 for receiving and initiating communication with a personal digital assistant computer system 100. Cradle 60 provides an electrical and mechanical communication interface between bus 54 (and anything coupled to bus 54) and computer system 100 for two-way communications. Computer system 100 also contains a wireless communication mechanism 64 for sending and receiving information from other devices. The wireless communication mechanism 64 can use infrared communication or other wireless communications such as a Bluetooth protocol.

Figure 2A:
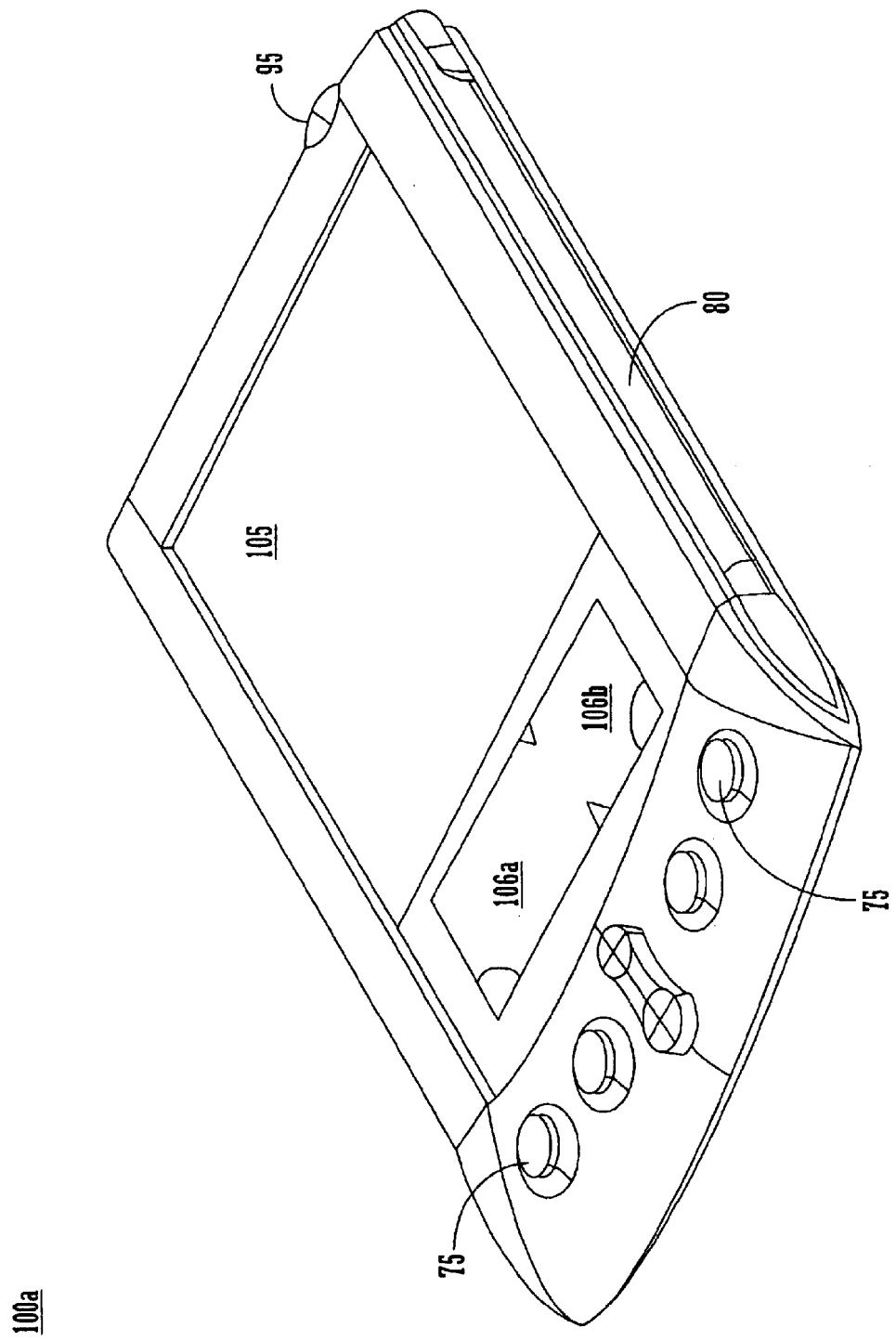
FIG. 2A is a top-side perspective view of an exemplary personal digital assistant computer system.

With reference to FIG. 2A, a perspective illustration of the top face 100*a* of exemplary personal digital assistant computer system 100 is shown. Top face 110a contains a display screen 105 surrounded by a bezel or cover. A removable stylus 80 is also shown. Display screen 105 is a touch screen capable of registering contact between the screen and the tip of stylus 80. Stylus 80 can be fabricated of any material which can make contact with screen 105. Top face 100a also contains one or more dedicated and/or programmable buttons 75 for selecting information and causing computer system 100 to implement functions. An on/off button 95 is shown as well.

Referring still to FIG. 2A, a handwriting recognition pad or "digitizer" containing regions 106a and 106b is also shown. Specifically, region 106a is for the drawing of alpha characters therein for automatic recognition and region 106b is for the drawing of numeric characters therein for automatic recognition. Stylus 80 is used for stroking a character within one of the regions 106a and 106b. The stroke information is then fed to an internal processor for automatic character recognition. Once characters are recognized, they are typically displayed on screen 105 for verification and/or modification.

Figure 2B:
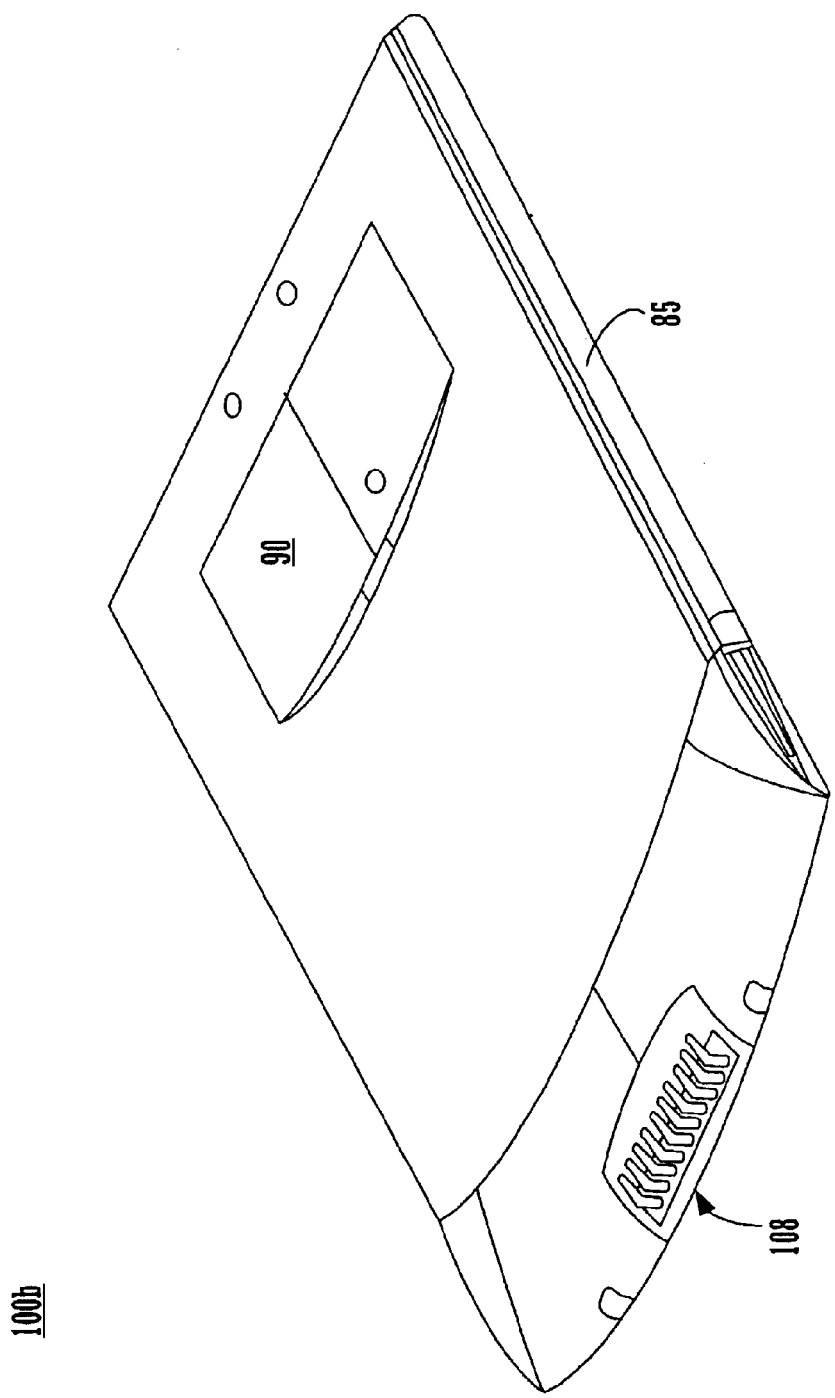
FIG. 2B is a bottom side perspective view of the personal digital assistant computer system of FIG. 2A.

FIG. 2B illustrates the bottom side 100b of one embodiment of personal digital assistant computer system 100. An optional extendible antenna 85 is shown, and a battery storage compartment door 90 is shown as well. A communication interface 108 is also shown. In one embodiment of the present invention, the serial communication interface 108 comprises a serial communication port, but it could also alternatively be of any of a number of well known communication standards and protocols, e.g., parallel, small computer system interface (SCSI), Ethernet, Firewire (IEEE 1394), etc. In a currently preferred embodiment, communication interface 108 comprises an interrupt pin and a device sense pin, sometimes also known as a VID pin.

Referring now to FIG. 3, a block diagram of exemplary personal digital assistant computer system 100 is shown. Computer system 100 includes an address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101. As described above, computer system 100 also contains a display device 105 coupled to bus 99 for displaying information to the computer user. As described further below, portions of memory units 102 and 103 can be removed from computer system 100. Moreover, computer system 100 can also include an optional data storage device 104 (e.g., memory stick) for storing information and instructions. In one embodiment, optional data storage device 104 is removable from computer system 100.

Also included in computer system 100 of FIG. 3 is an optional alphanumeric input device 106 which, in one implementation, is a handwriting recognition pad ("digitizer") having regions 106a and 106b (FIG. 2A), for instance. Device 106 can communicate information and command selections to central processor 101. Computer system 100 also includes an optional cursor control or directing device 107 coupled to bus 99 for communicating user input information and command selections to central processor 101. In one implementation, device 107 is a touch screen device incorporated with screen 105. In this implementation, device 107 is capable of registering a position on screen 105 where a stylus makes contact. Display device 105 utilized with computer system 100 may be a liquid crystal device (LCD), cathode ray tube (CRT), field emission device (FED, also called flat panel CRT) or other display device suitable for creating graphic images and alphanumeric characters recognizable to the user. In a currently preferred embodiment, display 105 is a flat panel display. Computer system 100 also includes signal communication interface 108, which is also coupled to bus 99, and can be a serial port for communicating with cradle 60. Communication interface 108 can also include number of wireless communication mechanisms such as infrared or a Bluetooth protocol.

Additionally, computer system 100 includes caller ID database 109. Caller ID database 109 may be incorporated into non-volatile memory unit 103, but may also be a separate memory device. In addition, computer system 100 includes a telephone or cellular phone circuit 111. The telephone circuit 111 can utilize any predetermined wireless or wired telephone protocols to connect to a telephone network 70 in FIG. 1. Also included in computer system 100 is a caller ID circuit 110. Caller ID circuit is coupled to the telephone or cellular phone circuit 111 to retrieve the phone number of an incoming call.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

FIG. 4 is an illustration of a database 400 with partial phone numbers as used in one embodiment of the present invention. Many caller ID systems, especially caller ID systems on cellular phones, will not display the name of the caller if the exact number is not previously programmed into the phone. In one embodiment of the present invention, a caller ID system would use a database of partial phone numbers with wild card values therein to retrieve information about the caller even if the phone number of the caller has not been previously stored.

A telephone number area code usually depicts where the call originates. If the area code of a telephone number is known, a simple look up table can be used to determine the geographical location of the caller. For example, FIG. 4 illustrates an identifier column 401 with a corresponding phone number column 402. In addition, FIG. 4 shows an incoming phone number entry 403. Incoming phone number entry 403 represents the caller ID information received with a call. If a call is received and the entry is not programmed into the database, the caller ID system of the present invention will look in the database for a close match of the phone number received. As in FIG. 4, if a call is received form the 408 area code, the caller ID system of the present invention will display "Santa Clara Colo." to alert the user of the geographic location of where the call originated.

In another embodiment, the caller ID system of the present invention is configured to recognize calls from a particular cellular carrier or city. Most cellular services use specific prefixes for the phone numbers used by their customers. When two phone numbers contain the same area code and prefix, it is very likely the two numbers originate from the same central office (if from a land line) or from the same cellular carrier (if a wireless call). For example, in FIG. 4 there is a partial match for a particular cellular service provider. The entry in the database 400 is (408) 691-****.

When a call is received and it contains a 408 area code and a 691 prefix, it can be assumed that the call originated from the same cellular service provider as the partial match in the database. In this case, the caller ID system will display which cellular service provider the call originated from. Furthermore, the database 400 contains an entry "San Jose" and the partial match is (408) 321-****. If a call received contains the 408 area code and 321 prefix, it can be assumed that the call received is from the same city as the partial match and the caller ID system will display the city the call originated from.

Furthermore, the partial match database 400 can be useful for determining calls originating from a particular business or company. For example, in a commercial telephone system (if it has a multitude of phone lines) all numbers share a similar area code and prefix. Different phone numbers are given to each phone in the company usually designated by an extension. In FIG. 4, there is an entry named "Work" and the partial match is (408) 123-45**. If a the phone number of a call received reads (408) 123-4567, the caller ID system will alert that "Work" is calling. In this embodiment, the call is known to originate from "Work" even though an exact match is not listed in the database. Furthermore, if the phone number of a call received reads (555) 555-5555, the caller ID system will look to database 400 and find the exact match for the phone number and will return the identifier "John Doe."

Database 400 also contains generic names and partial matches. In one embodiment of the present invention, the database 400 is pre-programmed to contain likely partial matches such as area codes and prefixes. In a preferred embodiment, the database is pre-programmed with generic data and can be personalized by the user to contain unique partial matches. The user can manipulate the database to contain the preferred partial matches for calls most likely received. For example, one can enter the area code and prefix of a workplace to recognize calls received from work. In addition to personalizing database 400, it is recognized that personalized ring tones can be programmed according to different types of calls. For example, a call received from a cellular phone can have a different ring tone than one that is received from a land line. In another embodiment, database 400 can be updated by connecting to the internet and downloading generic caller information such as area codes and prefixed to indicate geographic locations of incoming calls.

Figure 5:
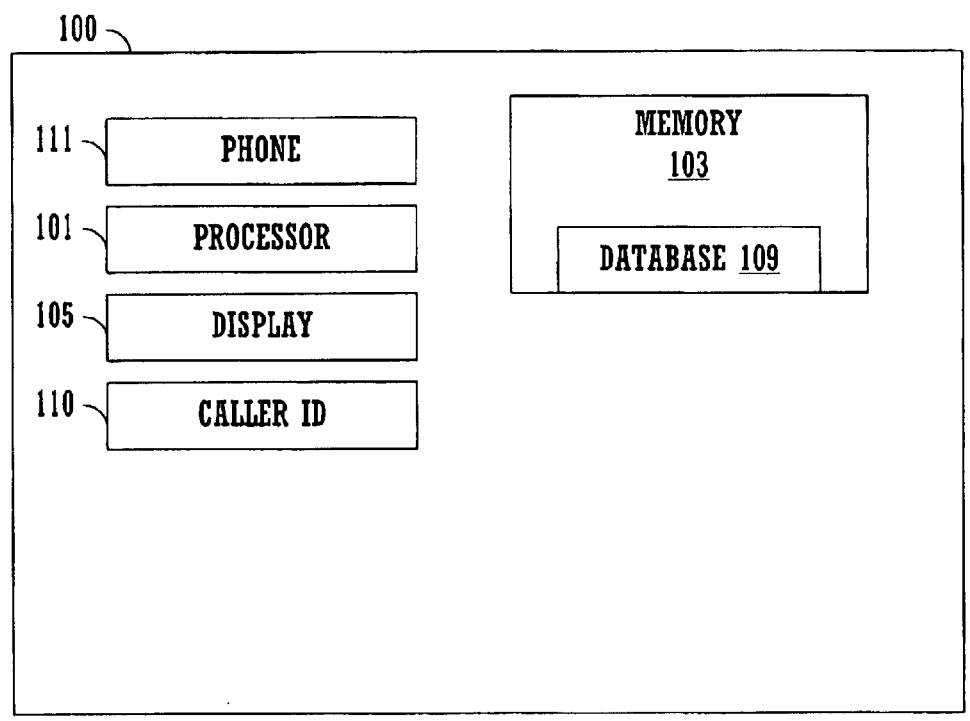
FIG. 5 is a logical block diagram of a caller ID system that is incorporated into a PDA.

FIG. 5 is a block diagram 500 of a caller ID system in accordance with the present invention. In the present embodiment, the device is a hand held device 100. However, it is appreciated that the wireless device may be another type of intelligent electronic device. In this embodiment, a telephone call is received by phone circuit 111 and the phone number associated with the incoming call is extracted by caller ID circuit 110. Once the phone number of the incoming call is determined, processor 101 looks to memory 103 to see if an entry in database 109 matches the number of the incoming call. In database 109, there exists a plurality of exact matches, partial phone numbers and wild card entries. If a match is found, the information associated to the database entry is displayed on display device 105.

Figure 6:
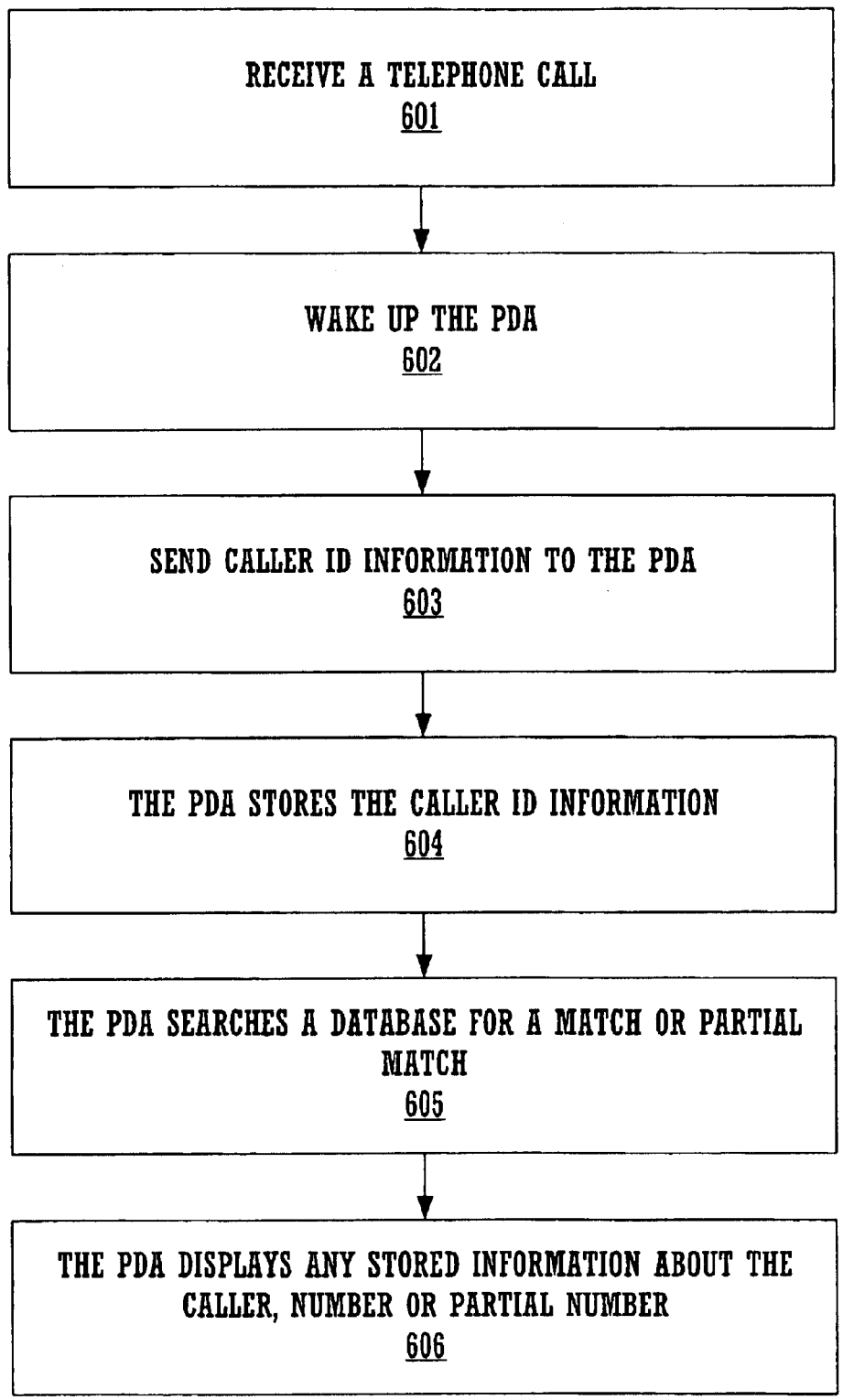
FIG. 6 is a flow chart of the process that occurs in one embodiment of the present invention when a PDA receives caller ID information.

FIG. 6 is a flow diagram 600 of the process of determining a caller from a partial match database on an electronic device. First a telephone call is received 601. When the call is received, it wakes up the PDA 602. U.S. patent application, Ser. No. 09/727,228, entitled "Method and System For Latency-Independent Peripheral Device Identification," PALM-3284 filed Nov. 29, 2002, hereby incorporated by reference herein, describes a system and method for identifying a peripheral device detachably coupled to a computer system. In one embodiment of the present invention, an incoming phone call wakes the PDA from a sleep mode 602. Once awakened, the caller ID information is extracted and it is transferred to the PDA for evaluation 603. To extend battery life, computer system 100 goes into a sleep mode when not in use. In one embodiment of the present invention, this system described in the application entitled "Method and System For Latency-independent Peripheral Device Identification," is used to wake up computer system 100 when a call is received. This allows computer system 100 to process the caller ID information received and display data associated to the caller ID information. In one embodiment, computer system 100 stores the caller ID information to memory for further manipulation. In step 604 the PDA stores the phone number in a database. The caller ID information is evaluated and the PDA searches a database for a match or partial match of the caller ID information received 605. If an exact match is found, the caller's name will be displayed 606. If a partial match is found, the information attached to the partial match will be displayed. In one embodiment, a tone is produced when a match is found and it is different depending on the identification of the caller.

Figure 7:
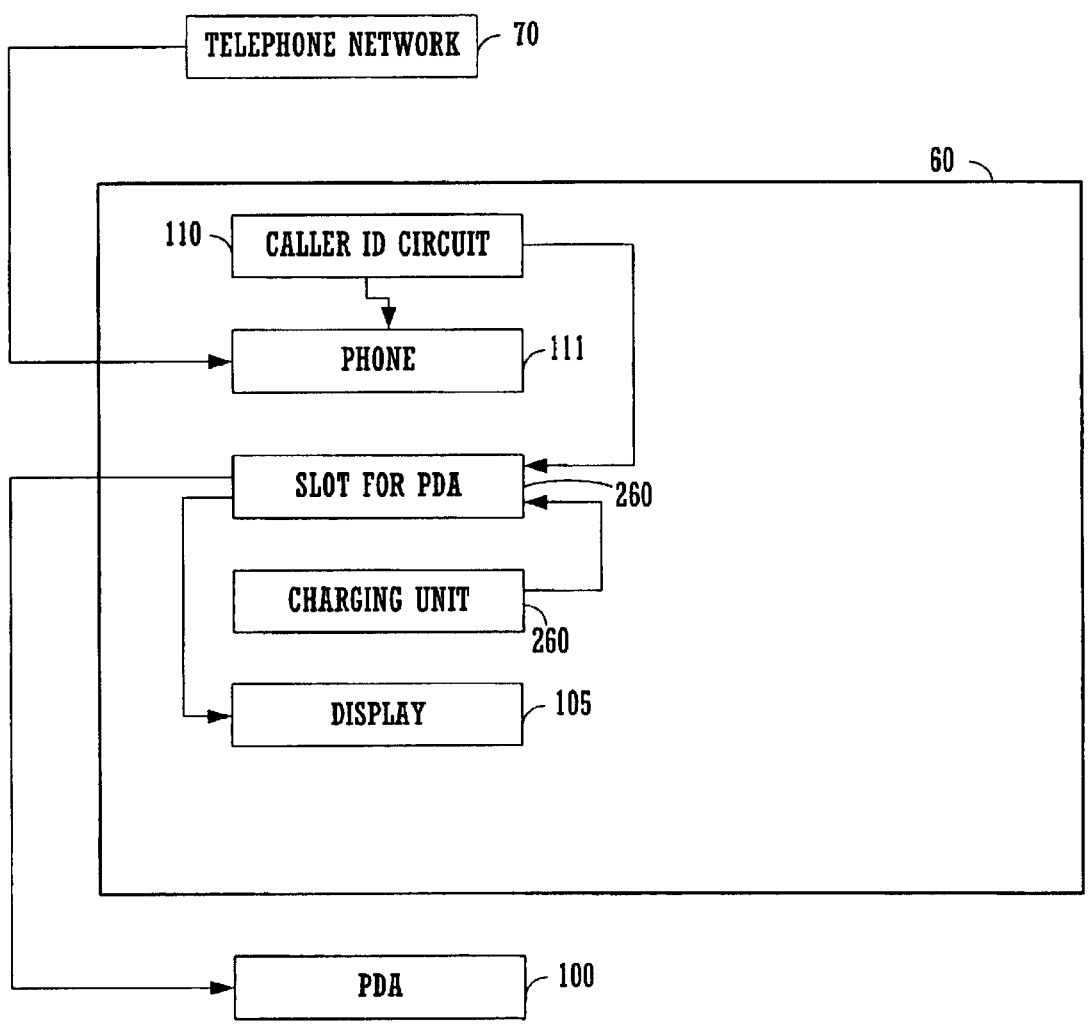
FIG. 7 is a logical block diagram of a caller ID system incorporated into a cradle device that is coupled to a phone line.

FIG. 7 is a block diagram 700 of a caller ID system that utilizes a cradle device 60 in combination with computer system 100. In this embodiment, cradle 60 comprises a slot 260 for PDA 100. Slot 260 provides a mechanical and electrical connection between cradle device 60 and computer system 100. Additionally, slot 260 can charge computer system 100. Cradle device 60 also comprises phone circuit 111 coupled to caller ID circuit 110 to retrieve the phone number of an incoming call from phone network 70. The phone number is sent to computer system 100 wherein process 600 (FIG. 6) retrieves information about the caller. The information is then displayed on display device 105.

Figure 8:
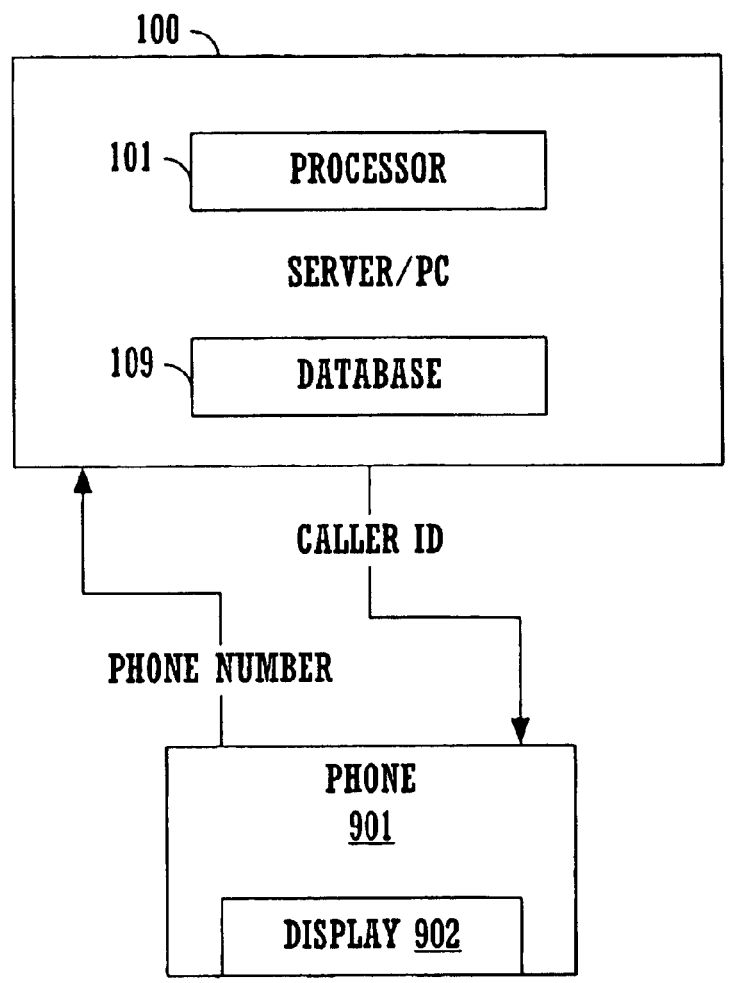
FIG. 8 is a logical block diagram of a caller ID system that incorporates a remote server/PC.

FIG. 8 is a block diagram 800 of a caller ID system that incorporates a remote phone system 901. In this embodiment, phone system 901 is remote from computer system 100. In this embodiment, phone system 901 receives a telephone call and an associated phone number. The information is sent by a wireless connection to the remote computer system 100. Once the information is received, the steps of process 600 (FIG. 6) are carried out and the caller information is sent back to the phone system 901 and displayed on display device 902.

Figure 9:
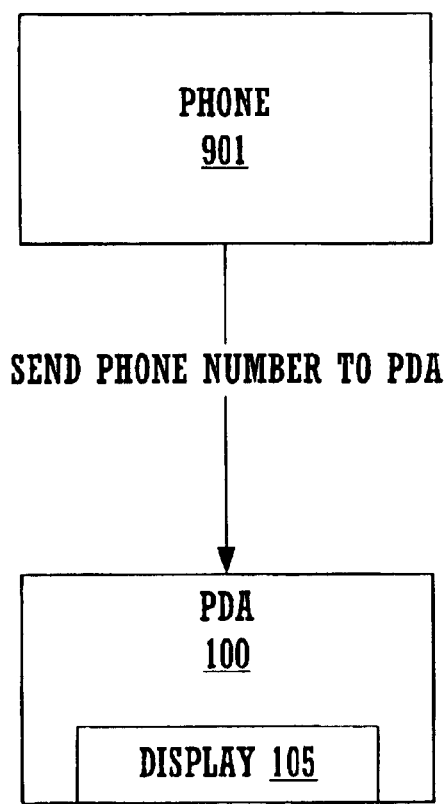
FIG. 9 is a logical block diagram of a caller ID system that incorporates a remote telephone system.

FIG. 9 is a block diagram 900 of a caller ID system similar to FIG. 8 but only incorporates one way communication between phone system 901 and computer system 100. In this embodiment, the phone system 901 receives a telephone call and an associated phone number and sends the information to computer system 100. Then the steps of process 600 (FIG. 6) are carried out and the caller information is displayed on computer system 100.

The preferred embodiment of the present invention, a caller identification system and method for use with partial information, is thus described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A caller identification system comprising:
   a caller identification logic unit coupled to a telephone network, wherein said caller identification logic unit determines the caller identification of an incoming telephone call;
   a local memory for storing a database comprising at least one partial phone number and a corresponding identification wherein said database is user customizable to store a unique partial phone number;
   a processor for determining if said caller identification of said incoming telephone call matches at least one partial phone number in said database and for retrieving its associated identification.

2. A system as described in claim 1 wherein said partial phone number comprises a telephone number area code.

3. A system as described in claim 1 wherein said partial phone number comprises a telephone number prefix.

4. A system as described in claim 1 wherein said partial phone number comprises wild card values.

5. A system as described in claim 1 wherein said processor and said memory are integrated within a personal digital assistant (PDA).

6. A system as described in claim 1 wherein said telephone network is a cellular network.

7. A system as described in claim 5 wherein said personal digital assistant (PDA) is coupled to the Internet.

8. A system as described in claim 1 wherein said system further comprises a display device for displaying the retrieved identification.

9. A caller identification system comprising:
   a) a cradle configured to dock a portable electronic device comprising:
      $a_1$) a first port for coupling to a telephone network;
      $a_2$) a caller identification logic unit coupled to said port, wherein said caller identification logic unit provides a phone number of an incoming telephone call;
      $a_3$) a second port for communicating;
   b) a portable electronic device for communicating with said second port and comprising:
      $b_1$) a local memory for storing a user customizable database containing at least one partial phone number and a corresponding identification;
      $b_2$) a logic unit for determining if said phone number of said incoming telephone call matches at least one said partial phone number in said user customizable database and for retrieving its associated identification.

10. A system as described in claim 9 wherein said partial phone number comprises a telephone number area code.

11. A system as described in claim 9 wherein said partial phone number comprises a telephone number prefix.

12. A system as described in claim 9 wherein said partial phone number comprises wild card values.

13. A system as described in claim 9 wherein said portable electronic device is a personal digital assistant (PDA).

14. A system as described in claim 9 wherein said user customizable database is an address book comprising a plurality of entries, each entry comprising a respective partial phone number and a corresponding identification.

15. A system as described in claim 9 wherein said portable electronic device communicates with said cradle with a wireless protocol.

16. A portable electronic device comprising:
    an embedded telephone circuit;
    caller identification logic coupled to said telephone circuit and for determining a phone number of an incoming telephone call;
    a user customizable local memory stored database comprising at least one partial phone number and an associated identification;
    a processor for determining if said phone number of said incoming telephone call matches at least one partial phone number in said database and for retrieving its associated identification.

17. A device as described in claim 16 wherein said telephone circuit is a wireless phone.

18. A device as described in claim 16 wherein said partial phone number is a telephone number area code.

19. A device as described in claim 16 wherein said partial phone number is a telephone number prefix.

20. A device as described in claim 16 wherein said partial phone number comprises wild card values.

21. A device as described in claim 16 wherein said portable electronic device further comprises a display device for displaying the retrieved identification.

22. In an electronic system, a method for providing caller information comprising:
    a) receiving a phone call and an associated phone number;
    b) indexing a local memory stored, user customizable database with said phone number to locate a match between said phone number and a partial number of said database;
    c) accessing an identification associated with said partial number of b);
    d) display said identification of c).

23. A method as described in claim 22 wherein said partial phone number is a telephone number area code.

24. A method as described in claim 22 wherein said partial phone number is a telephone number prefix.

25. A method as described in claim 22 wherein said partial phone number comprises wild card values.

26. A method as described in claim 22 wherein said electronic system is a Personal Digital Assistant.

27. A method as described in claim 22 wherein said electronic system further comprises a tone generator wherein said tone generator generates a tone when a match is found.

28. A method as described in claim 27 wherein said tone is different depending on caller information.

* * * * *